United States Patent [19]
Ensor

[11] Patent Number: 6,144,390
[45] Date of Patent: Nov. 7, 2000

[54] DISPLAY COMPOSITION TECHNIQUE

[75] Inventor: James Robert Ensor, Red Bank, N.J.

[73] Assignee: Lucent Technologies Inc., Murray Hill, N.J.

[21] Appl. No.: 08/906,216

[22] Filed: Aug. 4, 1997

[51] Int. Cl.[7] .................................................. G11B 27/02
[52] U.S. Cl. ............................................................ 345/473
[58] Field of Search ................................... 345/473, 474, 345/475

[56] References Cited

U.S. PATENT DOCUMENTS

| | | | |
|---|---|---|---|
| 5,546,518 | 8/1996 | Blossom et al. | 345/473 |
| 5,572,646 | 11/1996 | Kawai et al. | 345/473 |
| 5,583,979 | 12/1996 | Sonohara et al. | 345/473 |

*Primary Examiner*—Phu K. Nguyen
*Assistant Examiner*—Cliff N. Vo
*Attorney, Agent, or Firm*—Eugene J. Rosenthal

[57] ABSTRACT

A mix of computer graphics and video is employed to display images, and more particularly, the ratio of computer graphics to video is adjusted as a function of the available processing and transport capacity. The function for adjusting the ratio of computer graphics to video may also be dependent on the motion of the viewer's viewpoint.

24 Claims, 4 Drawing Sheets

(2 of 4 Drawing Sheet(s) Filed in Color)

DISPLAY COMPOSITION TECHNIQUE

TECHNICAL FIELD

This invention relates to the displaying of images using a mix of video and computer graphics.

1. Background of the Invention

Displaying computer graphics images can be computationally intensive. On the other hand, displaying digitized video, while typically less computationally intensive than displaying computer graphics, tends to be limited by the transport bandwidth available to bring the video from its location to where it is displayed on a screen. It is known in the prior art that a world may be represented to a viewer partly as computer graphic images and partly as video. However, the portion of the world represented by computer graphic images or as video was fixed. Thus, to adequately represent such a world, prescribed minimums for both processing capacity and transport bandwidth must be available.

One known technique for situations where the processing capacity or the transport bandwidth is inadequate below the prescribed minimum is to reduce the display rate. Another known technique is to display a coarser version of the image. However, such reductions in display rate or coarser image display are perceived by a viewer as a reduction in quality.

2. Summary of the Invention

I have recognized that, in accordance with the principles of the invention, in displaying a world a tradeoff may be made between displaying computer graphics and video as a function of the capabilities that are available. In other words, when processing capacity is inadequate to render the computer graphics but there is sufficient transport capacity, the portion of the image displayed as computer graphics may be reduced while the portion of the image displayed as video may be increased. Likewise, when transport capacity is inadequate to render the video, but there is sufficient processing capacity, the portion of the image displayed as video may be reduced while the portion of the image displayed as computer graphics may be increased. Advantageously, a world may be adequately represented even when a prescribed minimum for either processing capacity or transport bandwidth is not available.

Also, if the environment of the images is three dimensional, the viewer's viewpoint may be changing rapidly, which effectively reduces the available processing and transport capacity. Thus, in accordance with an aspect of the invention, the function for adjusting the ratio of computer graphics to video may be further dependent on the motion of the viewer's viewpoint.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

In the drawing.

DETAILED DESCRIPTION

Figure 1:
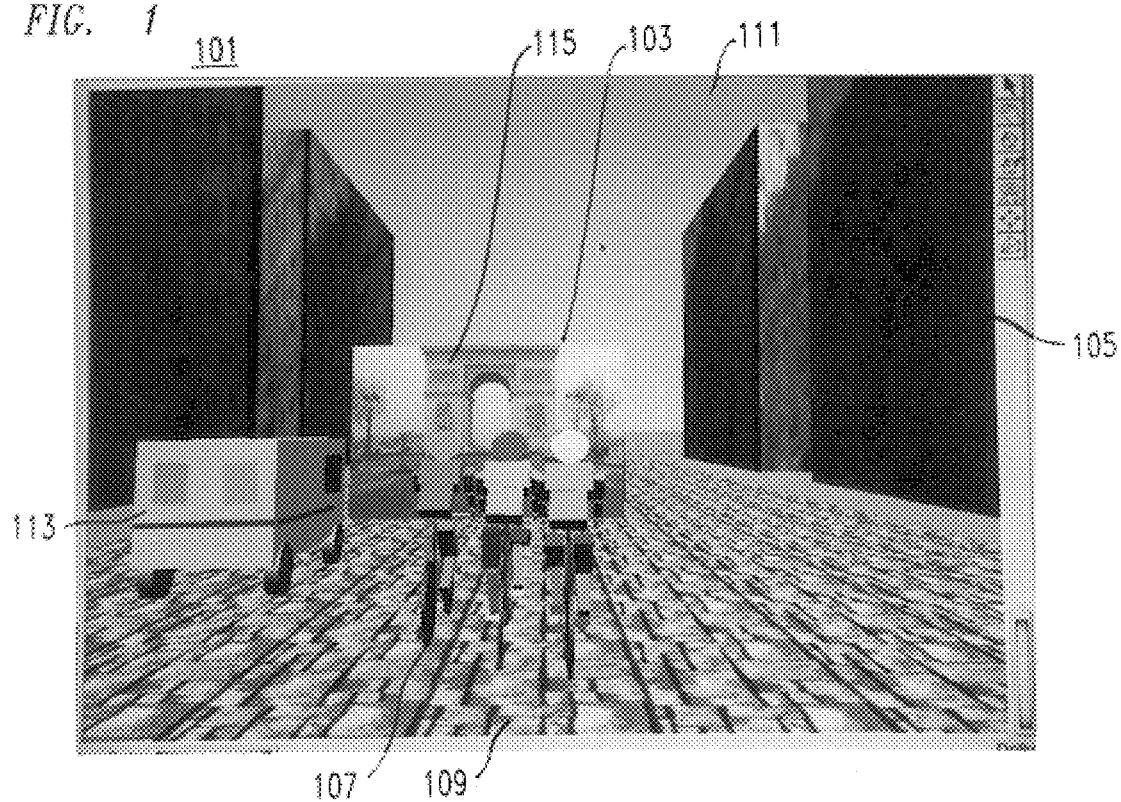
FIG. 1 shows a view of a world divided into two portions, a video screen, on which is shown a current frame of a video and the remainder of the world, which is represented using computer graphics techniques.

FIG. 1 shows a view of world 101, which is the Champs Elysees in Paris, France, as one approaches La Place de l'Etoile in the center of which is the Arc de Triomphe, built by Napoleon Bonaparte. World 101 is divided into two portions, video screen 103, on which is shown a current frame of a video and the remainder of the world 105, which is represented using computer graphics techniques, and is thus referred to herein as computer graphics part (CG Part) 105. The current frame of video being displayed on video screen 103 includes Arc de Triumph 115. Within CG Part 105 there are various elements, such as bicyclists 107, representing the user, road 109, sky 111, and police van 113. Note that the viewpoint of the user is actually behind the representation of the user in the form of one of bicyclists 107. In order to generate the image of world 101 shown in FIG. 1, a certain amount of processing capacity was required to generate CG Part 105 and a certain transport capacity was required in order to obtain the frame of video displayed on video screen 103 at the required frame rate.

Figure 2:
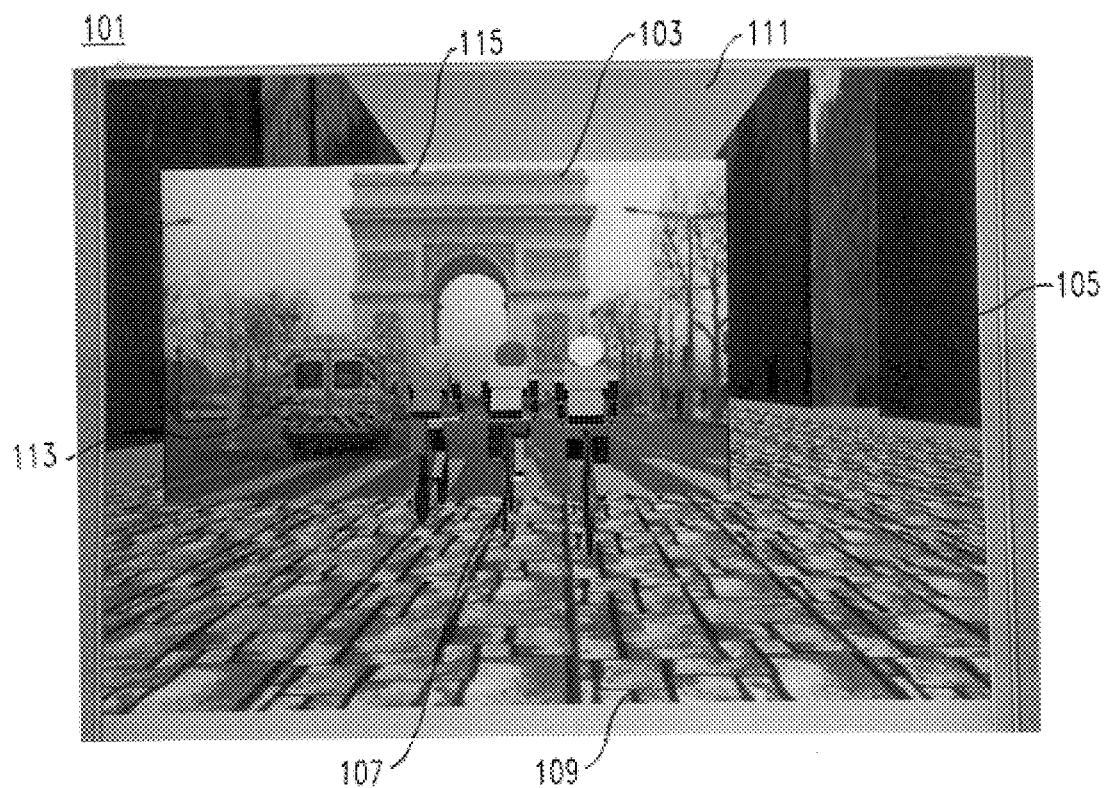
FIG. 2 shows the same view of the world of FIG. 1 but where the processing capacity available was less than that which was available when the image of the world shown in FIG. 1 was generated.

FIG. 2 shows the same view of world 101 but where the processing capacity available was less than that which was available when the image of world 101 shown in FIG. 1 was generated. Such a processing power reduction may result if the computer which is generating the image of world 101 is a multitasking computer and there were more tasks running at the time the view of FIG. 2 had to be generated. Note that in FIG. 2, in accordance with the principles of the invention, CG Part 105 is reduced in size while the frame of video on video screen 103 takes up a greater part of world 101, to compensate for the lack of available processing capacity. Thus, the frame of video on video screen 103 now includes police van 113 in addition to Arc de Triumph 115 which was already in the frame of video on video screen 103 of FIG. 1.

Figure 3:
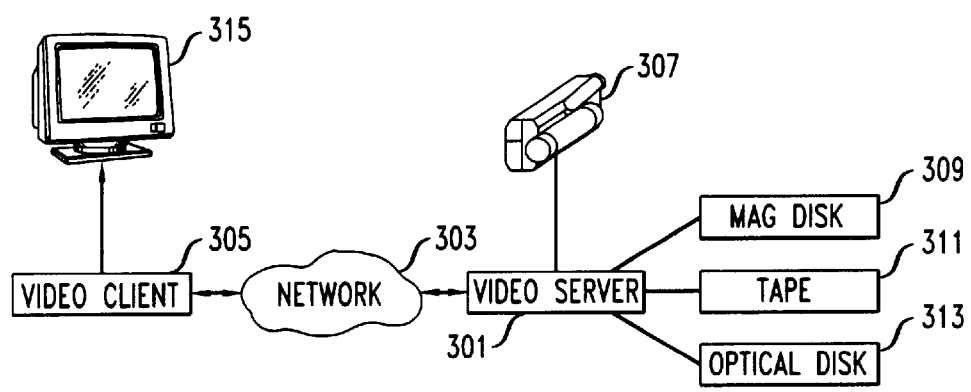
FIG. 3 shows an exemplary video communication system arranged in accordance with the invention.

FIG. 3 shows an exemplary video communication system 300 arranged in accordance with the invention. Video communication system 300 includes video server 301, network 303 and video client 305. Video server 301 transmits selected video to video client 305 via network 303. Video client displays the world, including any computer graphics parts and any video screen for display to a user. Video server 301 may obtain the video information from video camera 307, magnetic disk 309, video tape 311, or optical disk 313. Typically video server 301 formats the video information of the frames into packets and transmits the packets to network 303.

Network 303 attempts to transmit all of the packets to video client 305. However, network 303 is not always entirely successful. This lack of success is typically due to congestion which results in packets being dropped within network 303. The packets that successfully traverse network 303 are supplied to video client 305.

Video client 305 receives the packets from network 303 and reconstructs frames of the original video signal there-from. For purposes of this invention, it is assumed that any errors within a frame, e.g., as a result of packets dropped or damaged during transmission, are either compensated for by other techniques beyond the scope of this disclosure or they cause the entire frame containing such errors to be dropped. The reconstructed frames are converted into a signal suitable for display on video monitor 315. Video monitor 315 may be a computer monitor, a television, or the like.

Figure 4:
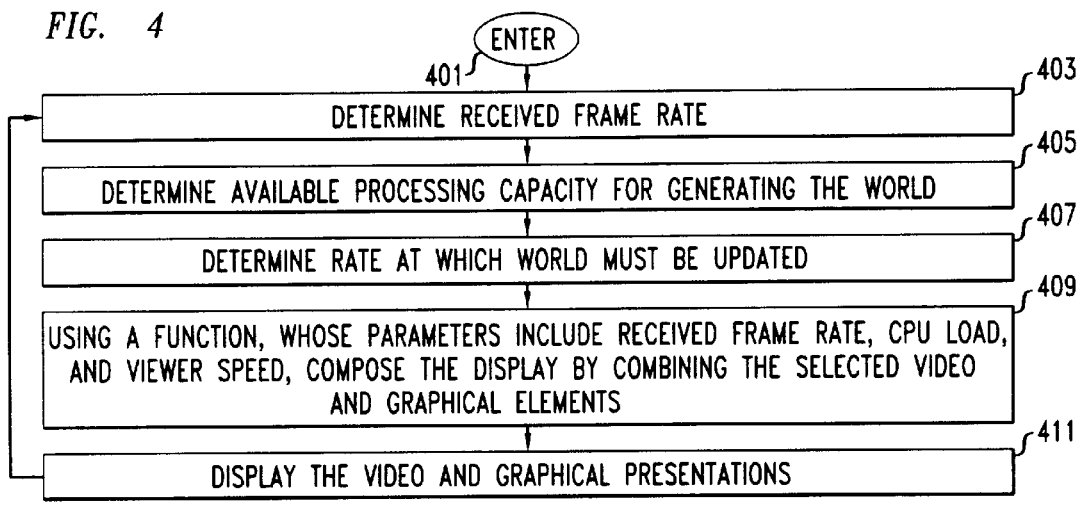
FIG. 4 shows a flowchart of a process for adjusting the ratio of computer graphics to video as a function of the available processing and transport capacity, in accordance with the principles of the invention.

FIG. 4 shows a flowchart of a process for adjusting the ratio of computer graphics to video as a function of the available processing and transport capacity, in accordance with the principles of the invention. The process is entered, in step 401, when it is time to display a refreshed version of the world. In step 403, the received frame rate of the video is determined. Next, the available processing capacity for generating the image of the world is determined in step 405. This is done by subtracting from the total processing capacity the processing capacity that is currently being used, or is anticipated to be used during the time that the image of the world is being generated, for tasks other than generating the image of the world.

In optional step 407, the rate at which the image of the world needs to be updated is determined. It may be necessary to perform this step, for example, if the world is a three dimensional world and the rate at which the image of the world needs to be updated is a function of the speed at which the viewer is moving through the three dimensional virtual space of the world. Such variable rate updating of the image is necessary, because when the user is moving quickly through the three dimensional world the image of the world needs to be updated more frequently than when the user is moving slowly through the three dimensional world. Thus, when the user is moving quickly through the three dimensional space, the two components of the world, the computer graphics part and the video part, need to be updated more frequently than when the user is moving slowly. However, more frequent updating of the two components of the world requires the availability of greater processing power and transport capacity than is required for less frequent updating.

In step 409, in accordance with the principles of the invention, the image of the world is divided into a computer graphics part and a video part. This is done, for example, by using a function the parameters of which may include the received frame rate, the available processing capacity, and the viewer speed. In one embodiment of the invention, the image of the world may be divided by determining how much computer graphics can be rendered in the available time, and the portion actually rendered as computer graphics is determined based on an extrinsic or intrinsic prioritization. Alternatively, the image of the world may be divided by determining how much of the video frame to be displayed is expected to be received by the time it needs to be displayed and generating the rest of the image using computer graphics. The image of the world is then composed in accordance with result of the function. Thereafter, in step 411 the generated image of the world, including both the computer graphics part and the video image is displayed.

Figure 5:
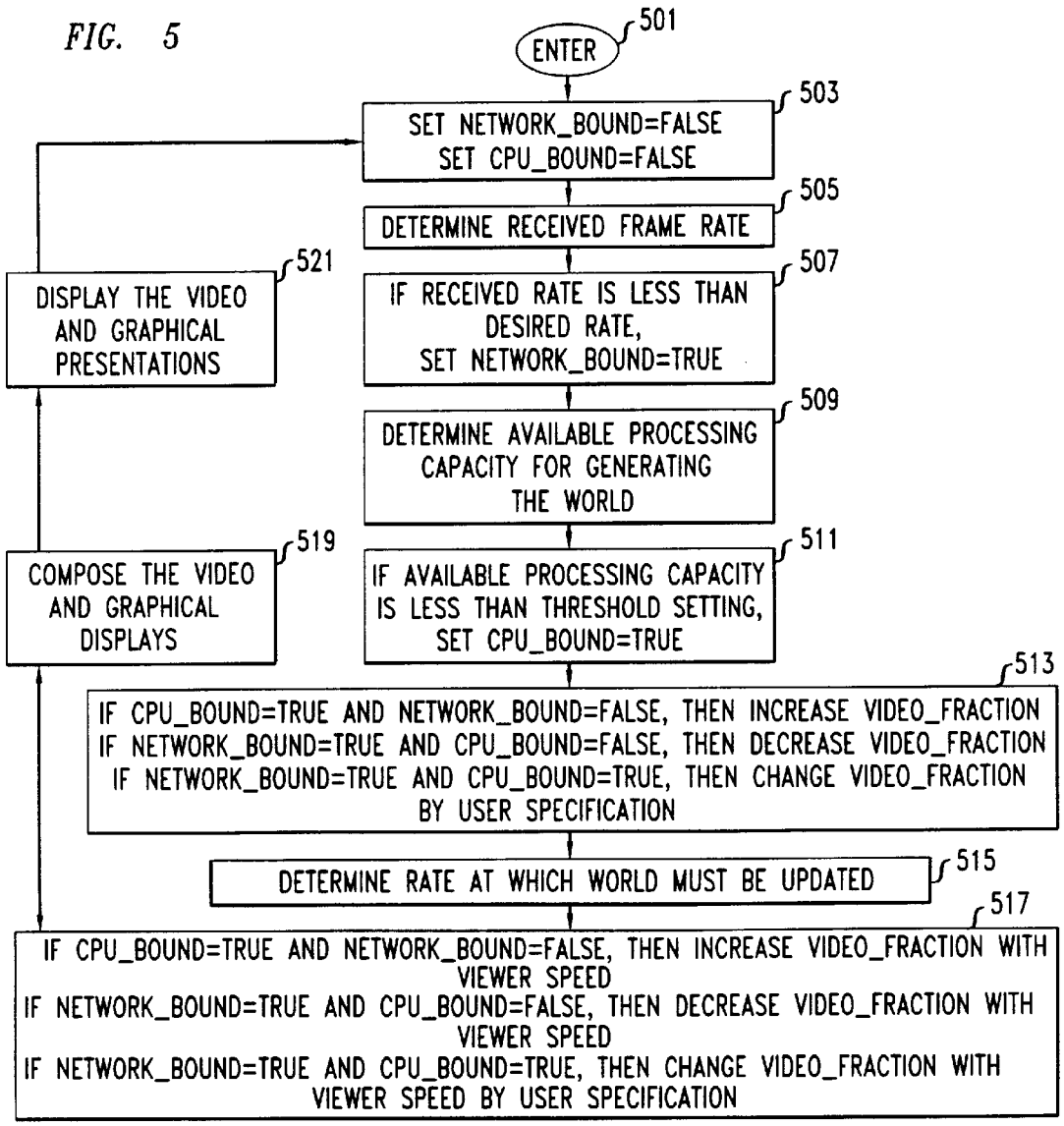
FIG. 5 shows a flow chart of a more detailed process for implementing the invention.

FIG. 5 shows a flow chart of a more detailed process for implementing the invention. The process is entered in step 501 when it is time to display a refreshed version of the world. Next, both flags network_bound and cpu_bound are set equal to false. Network_bound, when set equal to true, indicates that the network is unable to deliver the video frames at the desired rate, while cpu_bound, when set equal to true, indicates that there is insufficient processing capacity to generate computer graphics at the desired update rate. In step 505 the received frame rate of the video is determined.

Thereafter, in step 507, flag network_bound is set equal to true if the received frame rate is less than the desired frame rate. Next, the available processing capacity for generating the image of the world is determined in step 509. This is done by subtracting from the total processing capacity the processing capacity that is currently being used, or is anticipated to be used during the time that the image of the world is being generated, for tasks other than generating the image of the world.

In step 511, the flag cpu_bound is set equal to true if the available processing capacity is less than a threshold setting. The value of the variable video_fraction is updated in step 513. The value of the variable video_fraction indicates the portion of the world that will be generated as video. If cpu_bound is true and network_bound is false, the value of the variable video_fraction is increased, to indicate that because the available capacity of the processor is less than desired, a greater video portion, which can be delivered, is required. If network_bound is true and cpu_bound is false, then the value of video fraction is decreased, to indicate that because the available transport capacity is less than desired, a smaller video portion is to be employed along with a larger computer graphics area, which can be computed because the processing capacity is available. If network_bound and cpu_bound are both true, the value of video_fraction is adjusted either to its default value, or to a value selected by the user, or to the value that substantially will produce the best result, given the suboptimum conditions of insufficient processing capacity and insufficient transport capacity.

In optional step 515, the rate at which the image of the world needs to be updated is determined. This step may be performed, for example, if the world is a three dimensional world and the rate at which the image of the world needs to be updated is a function of the speed at which the viewer is moving through the three dimensional virtual space of the world. This is necessary, because when the user is moving quickly through the three dimensional world the image of the world needs to be updated more frequently than when the user is moving slowly through the three dimensional world. Thus, when the user is moving quickly through the three dimensional space, the two components of the world, the computer graphics part and the video part, need to be updated more frequently than when the user is moving slowly. To more frequently update the two components of the world requires additional processing power and transport capacity.

If optional step 515 is performed, the value of the variable video_fraction is again updated in step 517. If cpu_bound is true and network_bound is false, the value of the variable video_fraction is increased as a function of viewer speed. This is done because the available capacity of the processor is less than desired, so a greater video portion, which can be displayed, is necessary. If network_bound is true and cpu_bound is false, then the value of video_fraction is decreased as a function of viewer speed. This is because the available transport capacity is less than desired, and so a smaller video portion is to be employed, along with a larger computer graphics area which can be computed as the processing capacity for doing so is available. If network_bound and cpu_bound are both true, the value of video_fraction is adjusted either to its default value, or to a value selected by the user, or to a value that will produce the best result under the suboptimum conditions of insufficient processing capacity and insufficient transport capacity. Such value may be adjusted to take into account the contents of the image and the viewer speed.

In step 519 the video and graphical portion of the image is composed and the resulting image is displayed in step 521.

Control then passes back to step 503 and the process continues as described above.

Figure 6:
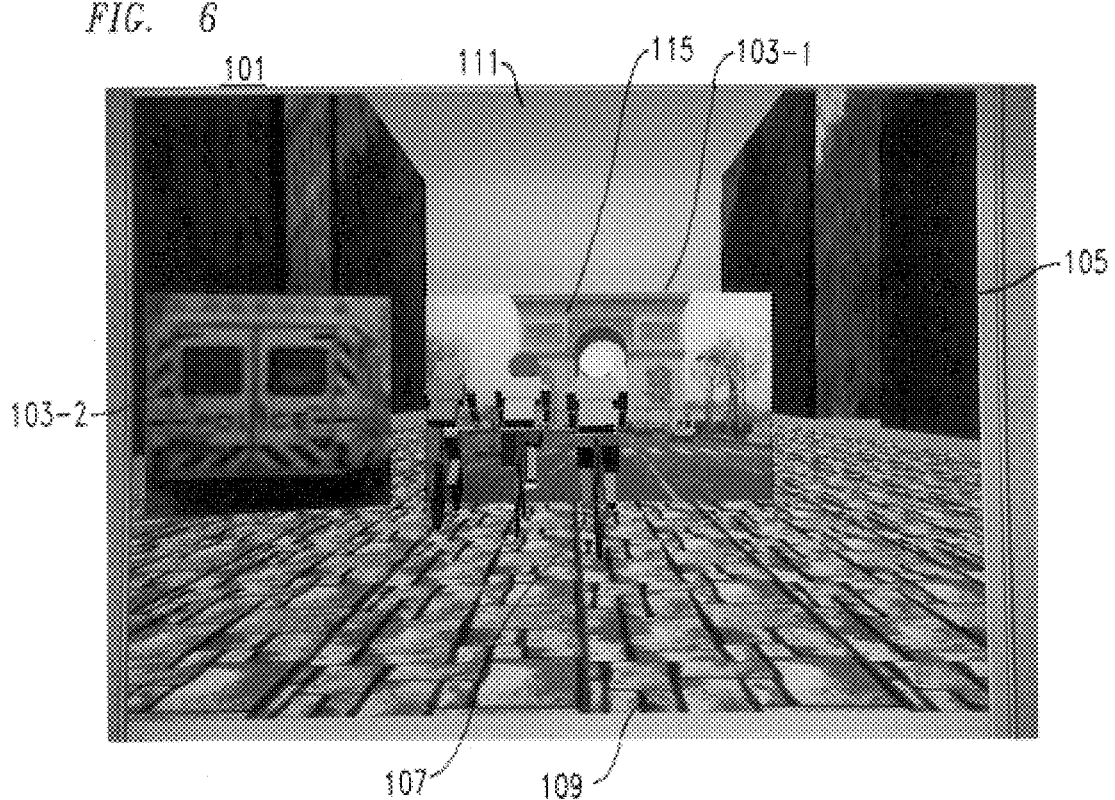
FIG. 6 shows an exemplary view of the world of FIG. 1 but employing multiple video screens, in accordance with an aspect of the invention.
Figure 7:
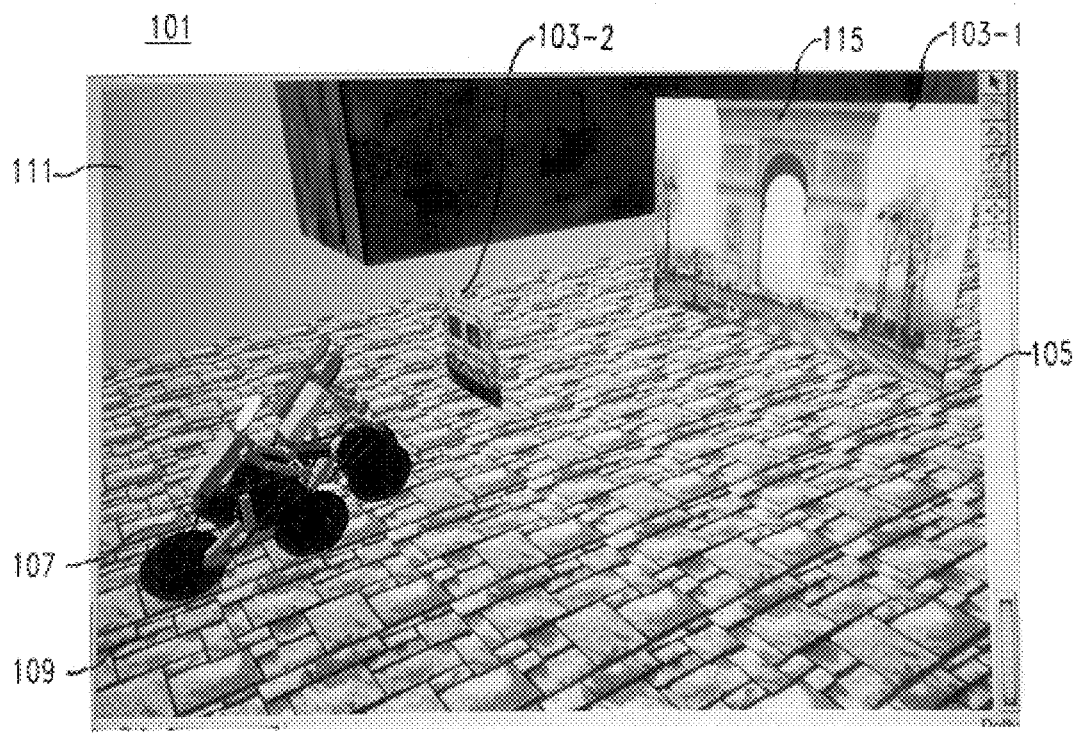
FIG. 7 shows the same view of world as in FIG. 6 but from a different user viewpoint.

Note that in the above-described example only a single video screen exists within the world. However, in accordance with an aspect of the invention it is possible to employ multiple video screens, which need not be contiguous, within the world. Such video screens may be created as needed as a function of the available processing capacity. Each video screen would have displayed thereon a video segment corresponding to what would otherwise have been generated using computer graphics had the necessary processing capacity to do so been available. An exemplary view of the world of FIG. 1 but employing multiple video screens, is shown in FIG. 6. More specifically, video screen 103-1 displays the same frame of video, including Arc de Triumph 115, as displayed on screen 103 of FIG. 1 while a video representation of police van 113 is displayed on video screen 103-2 in lieu of the computer graphics version thereof. For pedagogic purposes, so that one may better see the two video screens, FIG. 7 shows the same view of world as in FIG. 6 but from a different user viewpoint.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in processing frames of a signal, each of said frames representing an image that is made up of computer graphics, a video portion, or a combination thereof, the method comprising the steps of:
   determining an available processing capacity for said computer graphics and an available transport capacity for a video signal for display as said video portion; and
   adjusting the ratio of computer graphics to video portion in at least one of said frames as a joint function of said available processing and transport capacities.

2. The method as defined in claim 1 wherein an environment depicted within said images is three dimensional and a viewpoint of a viewer of said images is changing and wherein said joint function is further dependent on the motion of said viewer's viewpoint.

3. The method as defined in claim 1 wherein said video portion is displayed on a video screen within said image.

4. The method as defined in claim 1 wherein said video portion is displayed on a plurality of video screens within said image.

5. The method as defined in claim 1 wherein said video portion is divided into parts each of which is displayed one of plurality of video screens within said image.

6. A method for use in processing frames of a signal, each of said frames representing an image that is made up of computer graphics, a video portion, or a combination thereof, the method comprising the steps of:
   determining the available processing capacity for said computer graphics; and
   adjusting the ratio of computer graphics to video portion in at least one of said frames as a function of said available processing capacity.

7. The method as defined in claim 6 wherein an environment depicted within said images is three dimensional and a viewpoint of a viewer of said images is changing and wherein said function is further dependent on changes of said viewer's viewpoint.

8. The method as defined in claim 6 wherein said video portion is displayed on a video screen within said image.

9. The method as defined in claim 6 wherein said video portion is displayed on a plurality of video screens within said image.

10. The method as defined in claim 6 wherein said video portion is divided into parts each of which is displayed one of plurality of video screens within said image.

11. A method for use in processing frames of a signal, each of said frames representing an image that is made up of computer graphics, a video portion, or a combination thereof, the method comprising the steps of:
    determining the available transport capacity for a video signal for display as said video portion; and
    adjusting the ratio of computer graphics to video portion in at least one of said frames as a function of said available transport capacity.

12. The method as defined in claim 11 wherein an environment depicted within said images is three dimensional and a viewpoint of a viewer of said images is changing and wherein said function is further dependent on changes of said viewer's viewpoint.

13. The method as defined in claim 11 wherein said video portion is displayed on a video screen within said image.

14. The method as defined in claim 11 wherein said video portion is divided into parts each of which is displayed one of plurality of video screens within said image.

15. The method as defined in claim 11 wherein said video portion is displayed on a plurality of video screens within said image.

16. A video client, comprising:
    a video signal receiver;
    a processor for generating a computer graphics portion of a world and for placing a portion of a video received as a video signal by said video signal receiver on a screen in said world, said computer graphics portion and said video creating a substantially unified view of said world for a viewer, said processor determining a size of said computer graphics portion of said world as a function of available image processing capacity of said processor and available frame rate of said received video signal.

17. A video client, comprising:
    a video signal receiver;
    a processor for generating a computer graphics portion of a world and for placing a portion of a video received as a video signal by said video signal receiver on a screen in said world, said computer graphics portion and said video screen being adjusted in size relative to each other by said processor for a frame in accordance with a function of one or more of the set consisting of: computational capacity of said video client to generate said computer graphics portion, frame rate of said video available to said processor to generate said video for display on said video screen, change in a viewpoint of a viewer of said world.

18. A video client, comprising:
    a video signal receiver;
    a processor for generating a computer graphics portion of a world and for placing a portion of a video received as a video signal by said video signal receiver on a screen in said world, said computer graphics portion and said video screen being adjusted in size relative to each other for a frame by said processor in accordance with an available frame rate of said video signal.

19. A video client, comprising:
    a video signal receiver;
    a processor for generating a computer graphics portion of a world and for placing a portion of a video received as a video signal by said video signal receiver on a screen in said world, said computer graphics portion and said video screen being adjusted in size relative to each other by said processor in accordance with an ability of said video client to generate video for display on said video screen.

20. A video client for displaying a world, comprising:

means for receiving a video signal;

means for determining the frame rate of said video signal;

means for determining the available processing bandwidth;

means for generating a display signal representative of said world, said signal having a portion representative of computer graphics and a portion representative of a video, said display signal being divided into said portions as a function of at least one image factor which may be dynamically changing.

21. The video client as defined in claim 20 wherein said image factor is a member of the set consisting of: a frame rate of said received video signal, an available processing capacity of said video client, and a speed to be perceived by a viewer when said view has a viewpoint that is moving through said world.

22. A method for use in processing frames of a signal, each of said frames representing an image that is made up of computer graphics portion, a video portion, or a combination thereof, said computer graphics portion and said video portion each having a respective nominal size, the method comprising the steps of:

decreasing said computer graphics portion of said world for a frame when available image processing capacity is unable to depict said computer graphics portion of said world at said nominal size;

correspondingly increasing said video portion of said world so that an entire view of said world is presented to a viewer.

23. A method for use in rendering a world, said world being represented by a computer graphics portion, a video portion, or a combination thereof, said computer graphics portion and said video portion each having a respective first size for a rendering of said world, the method comprising the steps of:

decreasing the size of said computer graphics portion of said world for a subsequent rendering of said world when available image processing capacity is unable to depict said computer graphics portion of said world at said first size of said computer graphics portion of said first rendering;

correspondingly increasing said size of said video portion of said world to a size greater than said first size of said video portion so that an entire view of said world is presented to a viewer.

24. A method for use in rendering a world, said world being represented by a computer graphics portion, a video portion, or a combination thereof, said computer graphics portion and said video portion each having a respective first size for a rendering of said world, the method comprising the steps of:

increasing the size of said computer graphics portion of said world for a subsequent rendering of said world when available frame rate for said video portion is insufficient to generate said video portion at said first size;

correspondingly decreasing said size of said video portion of said world to a size smaller than said first size of said video portion so that an entire view of said world is presented to a viewer.

* * * * *